No. 636,839. Patented Nov. 14, 1899.
J. B. PECHT.
MACHINE FOR MOLDING CHEESE.
(Application filed June 22, 1899.)
(No Model.) 4 Sheets—Sheet 1.

WITNESSES: INVENTOR
John B. Pecht,
BY
Chas. C. Gill
ATTORNEY.

No. 636,839. Patented Nov. 14, 1899.
J. B. PECHT.
MACHINE FOR MOLDING CHEESE.
(Application filed June 22, 1899.)

(No Model.) 4 Sheets—Sheet 4.

WITNESSES:
Gustave Dieterich
John Kehlenbeck

INVENTOR
John B. Pecht,
BY
Chas. C. Gill
ATTORNEY

UNITED STATES PATENT OFFICE.

JOHN B. PECHT, OF NEW YORK, N. Y., ASSIGNOR TO FRANK J. BAUMERT, OF SAME PLACE.

MACHINE FOR MOLDING CHEESE.

SPECIFICATION forming part of Letters Patent No. 636,839, dated November 14, 1899.

Application filed June 22, 1899. Serial No. 721,431. (No model.)

*To all whom it may concern:*

Be it known that I, JOHN B. PECHT, a citizen of the United States, and a resident of New York, in the county of New York and State of New York, have invented certain new and useful Improvements in Machines for Molding Cheese, of which the following is a specification.

The invention relates to improvements in machines for molding cheese and like substances; and it consists in the novel features of construction and combinations of parts hereinafter described, and particularly pointed out in the claims.

The machine made the subject of the present application consists of a suitable receptacle to receive the cheese in bulk, a dial below said receptacle containing molds and movable plungers, and an endless conveying-belt, the said dial being located intermediate the said receptacle and the said belt in order that the cheese from the receptacle may enter the molds of the dial and, during the revolution of the latter, be ejected by the plungers and allowed to descend upon the sections of the endless belt. The machine further comprises mechanism for rotating the said dial and actuating the plungers in the molds thereof, and also to effect the downward movement of the cheese within the receptacle, so that the same may be forced through the aperture in the bottom thereof and enter the molds of the dial.

The invention will be more fully understood from the detailed description hereinafter presented, reference being had to the accompanying drawings, in which—

Figure 1:
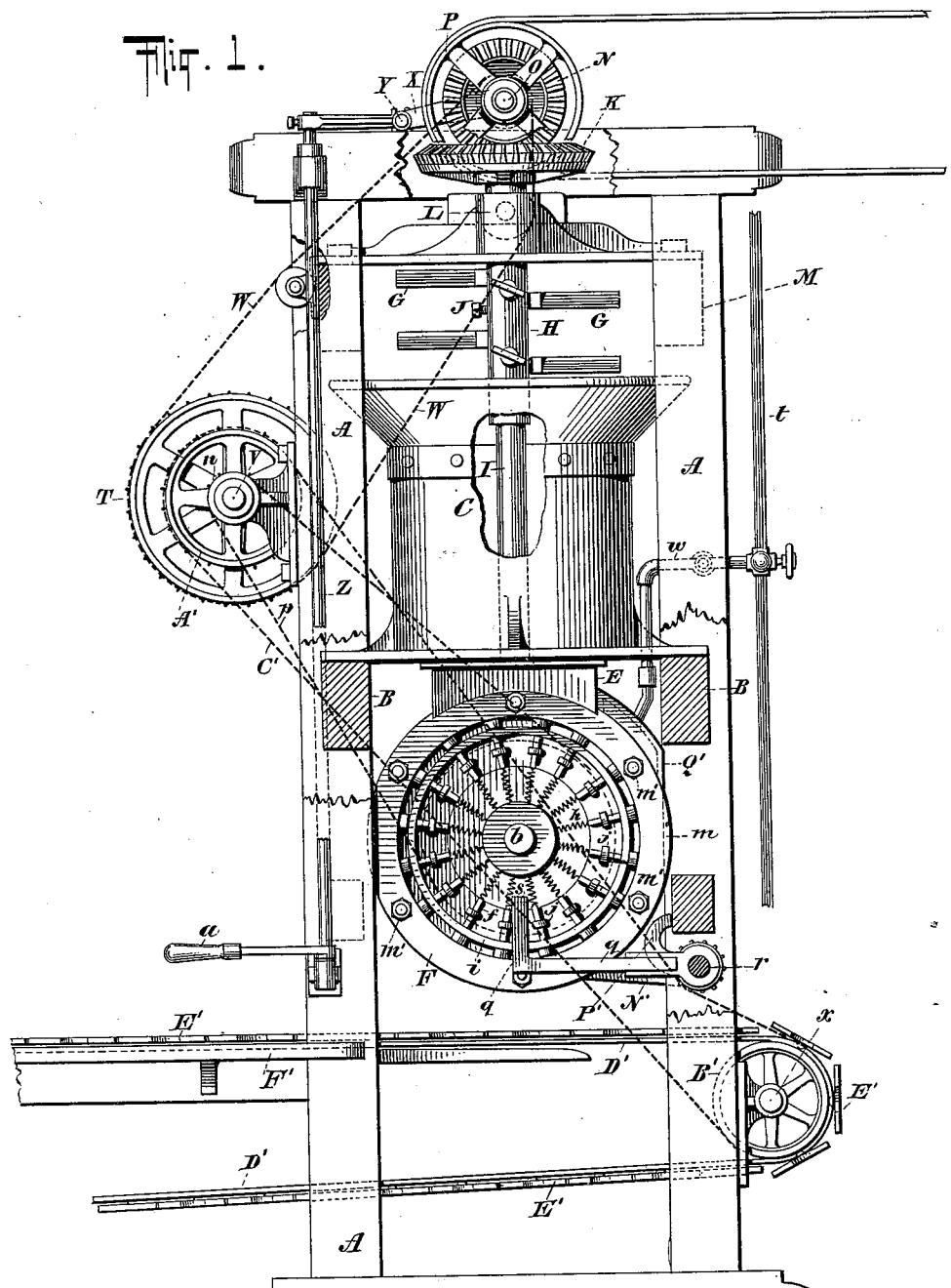
Figure 2:
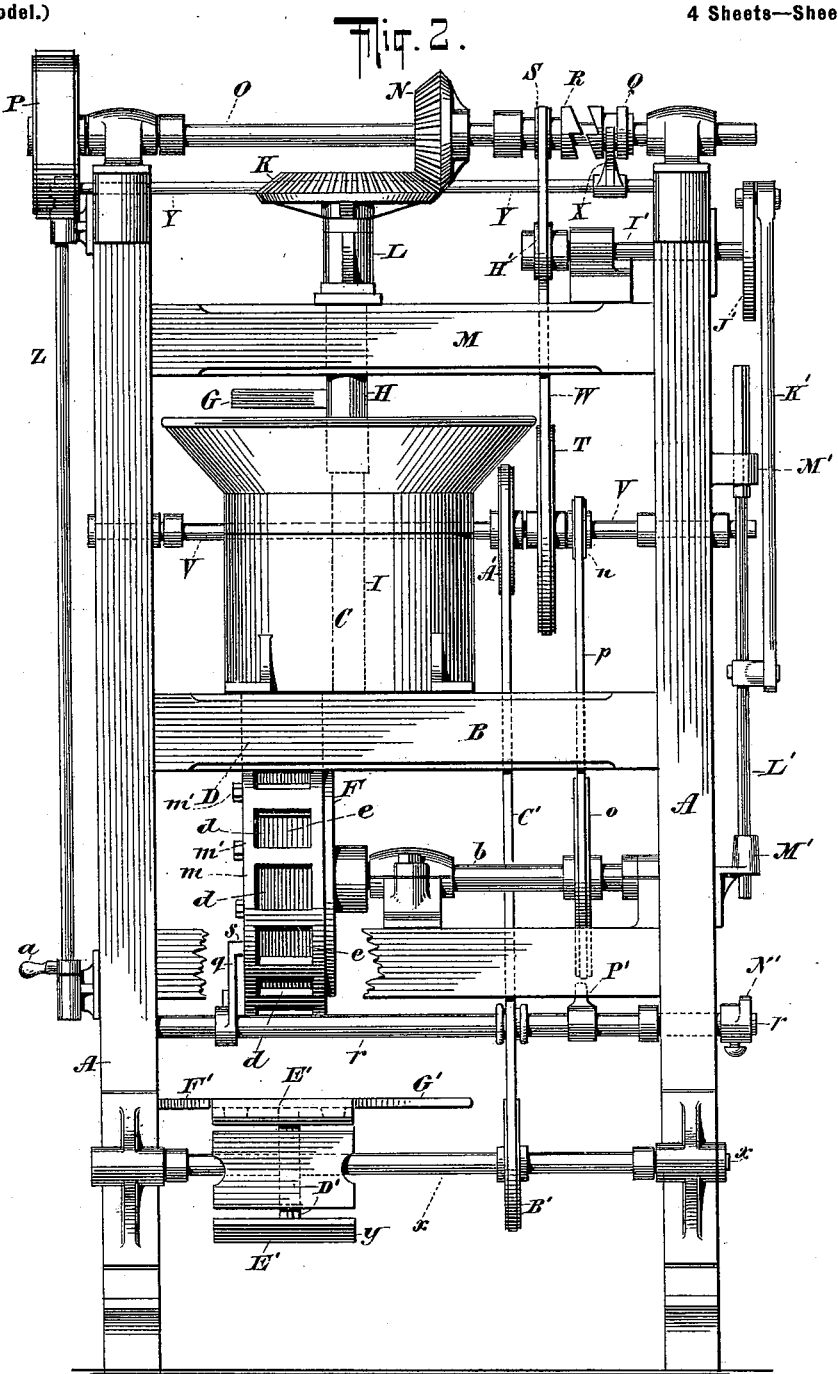
Figure 3:
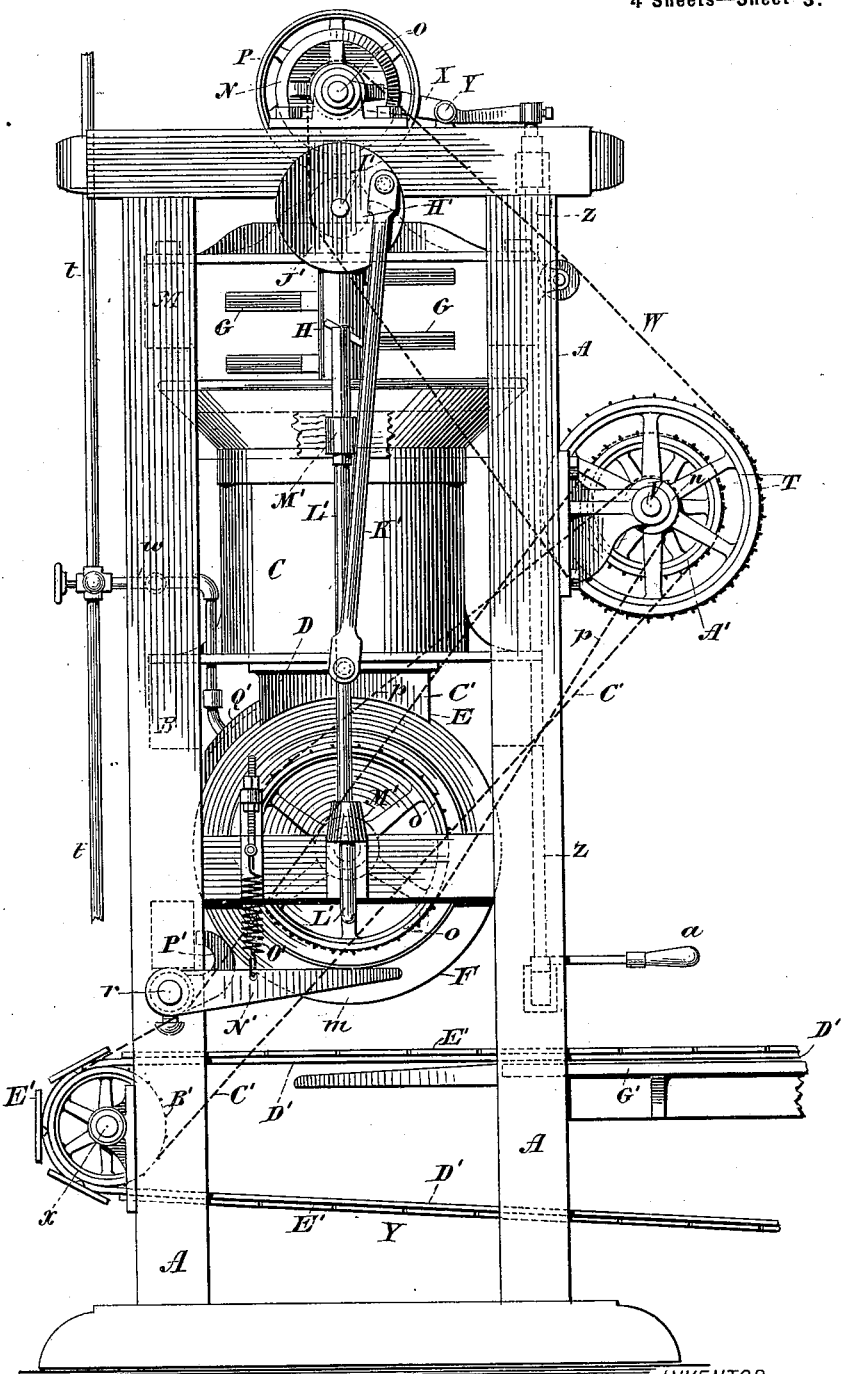
Figure 4:
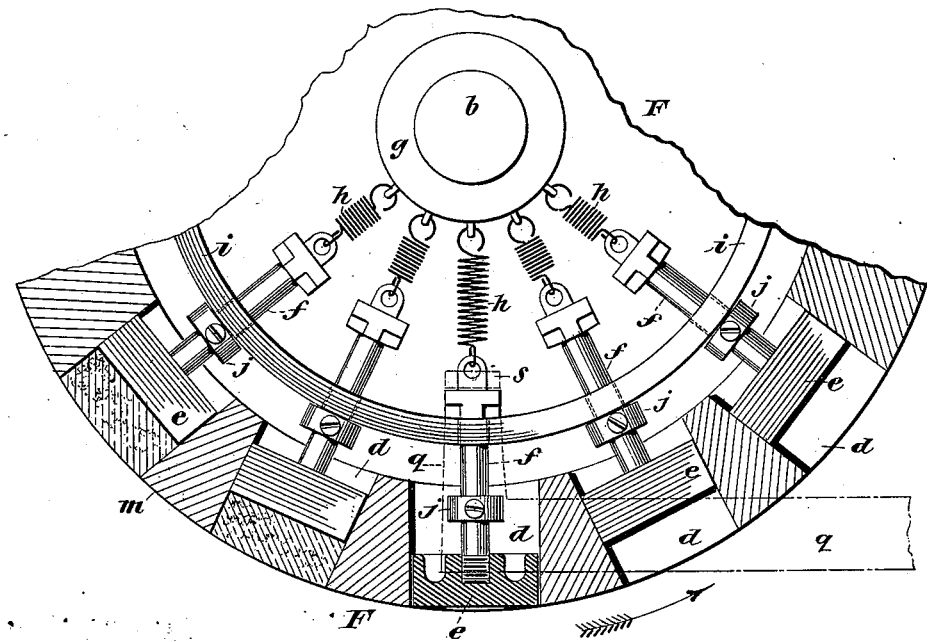
Figure 5:
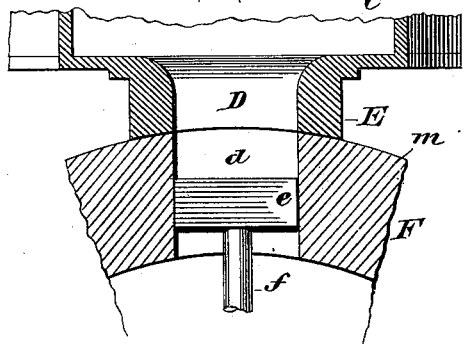

Figure 1 is a front elevation of a machine constructed in accordance with and embodying the invention, a part of the supporting-frame being partly broken away and in section to disclose more fully the operative mechanism of the machine. Fig. 2 is a side elevation of same. Fig. 3 is a rear elevation of same. Fig. 4 is an enlarged face view, partly in section, of the revoluble dial having the molds and plungers by which the cheese is formed or molded and then ejected upon the endless belt; and Fig. 5 is a detached vertical section through the adjoining portions of the receptacle and revoluble dial.

In the drawings, A designates the main supporting-frame of the machine, which frame will usually consist of upright wooden beams connected by suitable transverse bars to form a rectangular-shaped frame of durable construction and capable of withstanding the strain of the operative mechanism.

Within the frame A and supported upon the transverse bars B is the receptacle C, which has an outwardly-flaring mouth and is adapted to receive the cheese in bulk. The receptacle C contains an outlet-aperture D, Fig. 5, in its base and is provided around said aperture with the depending flange E, whose lower edges have the outline of the arc of a circle to correspond with and fit against the periphery of the dial F, located centrally below it. The receptacle C is stationary and contains the revoluble arms G, which are secured to or form a part of the sleeve H, mounted upon the vertical shaft I, which extends downward centrally into the receptacle C. The sleeve H, carrying the blades or arms G, is in Fig. 1 shown in its upward position upon the spindle or shaft I; but it is to be understood that when the machine is to be put into use and the cheese placed in the receptacle C the sleeve H, with its blades G, will be slid downward on the shaft I, so as to be within the said receptacle, where it will be secured by means of a set-screw J, the said set-screw being the means by which the sleeve H may be secured to the shaft I, either at the upper or lower end of the latter. When the sleeve H, with its blades G, is in its upper position, as shown in Fig. 1, the entire interior of the receptacle C is left clear and may be readily inspected or cleaned.

The shaft I is suspended from the beveled gear-wheel K and passes through a bearing L, which is in the form of a vertical sleeve secured by means of transverse arms upon the cross-bars M, as illustrated more clearly in Fig. 2. The bevel gear-wheel K engages the bevel-pinion N, mounted upon the main driving-shaft O, and hence the motion of the said shaft O is communicated through the said bevel gear-wheels to the said shaft I and thence to the sleeve H and blades G, the latter having a revolving motion within the receptacle C and by reason of their inclination forcing the cheese downward through the outlet D and into the molds of the dial F, hereinafter described.

The driving-shaft O has upon one end a belt-wheel P and at its opposite end the clutch, Fig. 2, consisting of the sleeve Q, keyed upon the shaft, and the sleeve R, which is loose upon the shaft and carries the small sprocket-wheel S, the latter being connected with the sprocket-wheel T on the intermediate shaft V by means of the sprocket-chain W, the purpose of which will appear hereinafter. The sleeve Q, forming a part of the clutch on the main driving-shaft O, is connected by the usual forked arm X with the sliding rod Y, which through the medium of a link is connected with the vertical axially-revoluble rod Z, having a handle $a$ at its lower end in convenient relation to the traveling endless belt Y to enable the attendant to reach and operate the same when desired.

The revoluble dial F is mounted upon the shaft and contains around its rim or periphery the series of molds $d$, whose size and outline will conform with the shape and size of the blocks, cakes, or forms of cheese to be produced. The molds $d$ consist of apertures of the proper size and shape extending entirely through the outer portion or rim of the said dial F, and within the molds $d$ are the independent plungers $e$, secured to the rods $f$, Fig. 4, which extend on radial lines inward toward the hub $g$ of the said dial. The inner ends of the rods $f$ are connected by means of springs $h$ to the said hub $g$, and hence have a constant spring tension inward toward the center of the dial, thus giving the plungers $e$ a normal position at the inner ends or bottoms of the molds $d$. The rods $f$ pass freely through the apertures in the ring $i$ of the dial, and each is provided intermediate the ring $i$ and the rim of the dial with a collar $j$, which is adjustable on the rods and is adapted to be secured at any set point by means of the set-screw illustrated. The collars $j$ bear against the outer surface of the ring $i$ and prevent the plungers $e$ from being drawn inward too far. By adjusting the collars $j$ on the rods $f$ the plungers $e$ in their normal relation to the molds $d$ may be arranged at will to regulate the depth of the latter. When the collars $j$ are moved inward on the rods $f$ and secured at a greater distance from the plungers $e$ than that shown in the drawings, the result is that the plungers will necessarily occupy a normal position farther outward in the molds $d$ and lessen the depth of the latter, while, on the other hand, the nearer the collars $j$ are adjusted toward the plungers $e$ the farther will the latter be drawn inward by the springs $h$ and the deeper will the operative or exposed part of the molds $d$ become. The exterior rim of the dial F, containing the molds $d$, is lettered $m$, Figs. 4 and 5, and this rim, when it is necessary to mold cakes of cheese of different outline from the form of molds indicated in the drawings, will (by first loosening the bolts $m'$, Fig. 1) be removed from the main body or disk-base of the dial F, and a new rim of the same construction, but containing molds of a different outline, will be substituted, and the plungers $e$ will be unscrewed, Fig. 4, from the rods $f$ and substituted by plungers of a shape conforming to the form of the molds in the new rim. Thus the rim $m$ and plungers $e$ alone will be discarded when cakes of a new form are to be manufactured without disturbing the main body of the dial F. The shaft $b$, connected with the dial F, receives its motion from the shaft V through the medium of the sprocket-wheels $n$ $o$ and sprocket-chain $p$, and the shaft V receives its motion from the main driving-shaft O through the medium of the sprocket-wheels S T and chain W, hereinbefore referred to.

During the revolution of the dial F from the main driving-shaft O through the intermediate connecting-gearing above referred to the cheese from the receptacle C is expelled through the outlet-opening D into the molds $d$, one after another, as they pass below said opening, and as the molds $d$, one after another, come directly over the endless belt Y the said cheese is ejected from the molds one after another in succession by means of the arm $q$, secured to the rock-shaft $r$, Fig. 1, and having at its upwardly-extending upper end the finger $s$, Fig. 2, which engages the plunger-rods $f$, as indicated by dotted lines in Fig. 4. During the operation of the machine the shaft $r$ has a rocking motion imparted to it, and this motion is utilized through the arm $q$ and finger $s$ to quickly depress the plunger $e$ of each mold $d$ when said mold has attained its lowermost position directly over the endless belt Y. The finger $s$ of the arm $q$ presses the plunger $e$ downward, Fig. 4, thereby ejecting the cake or form of cheese and permitting the latter to descend of its own specific gravity to the endless belt Y, and said finger $s$, after depressing the plunger $e$, is immediately elevated to permit the spring $h$ to return the plunger to its former position. The rock-shaft $r$ and arm $q$ receive their motion in one direction from the main driving-shaft O through the medium of the chain W, sprocket-wheel H', Fig. 2, shaft I', crank-wheel J', pitman-rod K', Figs. 2 and 3, and vertically-reciprocating rod L', the latter being mounted in guides M' and adapted when depressed to strike the arm N' and move the same downward, thereby turning the shaft $r$ and causing the arm $q$ to depress the plungers $e$. The shaft $r$ and its connecting-arms $q$ and N' are returned to their normal position by means of the spring O', a stop P' serving to prevent the spring from turning the shaft $r$ too far.

At one side of the receptacle C is provided the vertical steam-pipe $t$, having the branch $w$ leading to a point directly over the molds $d$ as they pass inward below the outlet D from the receptacle C, and the purpose of this arrangement of the steam-pipes is to permit the injection of a limited quantity of dry steam into the molds $d$ for the purpose of warming the same preparatory to their receiving the cheese from the outlet-opening D. The discharge of steam from the pipes $t\ w$ will be regulated by a suitable hand-valve. The branch pipe $w$ leads directly into a hollow jacket $Q'$, which closely fits the periphery of the dial F and serves to restrain the steam and cause it to enter and suitably heat the molds $d$.

Below the revoluble dial F is the endless traveling belt Y, mounted upon supporting-wheels and receiving its motion from the shaft V through the sprocket-wheels $A'\ B'$ and connecting-chain $C'$, the latter wheel being mounted on the shaft $x$. The endless traveling belt Y is composed of the flexible chain or band $D'$ and the series of correspondingly-shaped boards $E'$, secured thereto and separated a suitable distance apart and each adapted to receive a cake of cheese from one of the molds $d$ of the dial F. At the sides of the belt Y are provided the tables $F'\ G'$, Fig. 2, between which the upper half of the said belt Y travels and which are of suitable dimensions to permit boys to utilize the same as tables upon which the cakes of cheese may be drawn from the boards $E'$ of the endless belt and wrapped in suitable foil or paper.

In the operation of the machine, the cheese being in the receptacle C, the power will be applied to the shaft O and the rod Z will be turned to throw the sleeve Q into engagement with the sleeve R, the result being that the gear-wheels N K will revolve the shaft I, sleeve H, and blades G, and the sprocket-wheel S will, through the connecting-chains and wheels, set in motion the shafts V, $b$, $x$, and $I'$, whereby the dial F will be caused to rotate, the belt Y to receive its traveling motion, and the thrust-rod $L'$ to have imparted to it its reciprocating motion from the shaft $I'$, crank-wheel $J'$ thereon, and pitman-rod $K'$, extending from said crank-wheel to said rod. The cheese being in the receptacle C and the operative parts of the machine being in motion, the molds $d$ will pass beneath the steam-jacket $Q'$, so as to become heated, and then beneath the outlet D to become filled with the cheese expelled downward by the blades G, whence the molds $d$, one after another, will pass onward and downward to their lowermost position over the belt Y, on arriving at which point the arm $q$, actuated by the contact of the thrust-rod $L'$ against the contact-arm $N'$, will depress the plunger $e$ in line with it and eject the cakes of cheese, allowing the latter to fall upon the boards $E'$ of the belt Y, by which they will be carried between the tables $F'\ G'$ to the boys, who will remove the cakes to said tables and wrap them in foil or paper, as required.

In the practical use of the machine the wrapper of paper or foil is placed on each board $E'$ before it passes beneath the dial F in order that the cake of cheese may descend directly upon the wrapper, the edges of which serve as means whereby the cake of cheese may be withdrawn to the tables $F'\ G'$ preparatory to the wrapper being completely folded about it. Thus the cakes or forms of cheese may be completely molded and wrapped without coming into contact with the hands of the attendants. During the revolution of the dial F the lower edge of the flange E prevents any surplus particles of cheese from being carried around on the exposed surfaces of the periphery of the dial and serves to smooth off the top of the cakes of cheese on a level with the outer edges of the molds $d$.

If during the operation of the machine it should for any reason be desired to temporarily stop the machine, this may be accomplished by simply moving the handle $a$ to revolve the rod Z and cause, through the intermediate connections, the clutch-sleeve Q to slide from contact with the clutch-sleeve R, by which operation the motion of the shaft O, while it will continue to revolve the wheels N K, will be entirely cut off from the chain W, shaft V, shaft $b$, and shaft $x$. The operative parts of the machine may be quickly set in motion again by reversing the movement of the handle $a$ and rod Z to restore the contact of the clutch-sleeve Q with the clutch-sleeve R. The timing of the mechanism is such that as each mold $d$, filled with cheese, reaches its lowest position during the revolution of the dial F one of the boards $E'$ of the endless belt appears directly below it, and the thrust-rod $L'$ descends to cause the ejection of the cheese from the mold.

The machine above described is adapted for molding the various kinds of cheese, the form of molds $d$ shown in the drawings being intended for square cream-cheese. When Neufchâtel cheese is to be molded, the rim $m$ and plungers $e$ will be removed from the dial F and a rim substituted having molds $d$ of the size of cakes of Neufchâtel cheese with plungers $e$ corresponding in shape and fitting the molds.

I do not confine the invention to the use of the blades G as means for expelling the cheese downward through the outlet D from the receptacle C, as various other devices may be used in lieu of the blades for a like purpose.

What I claim as my invention, and desire to secure by Letters Patent, is—

1. In a machine for molding, the receptacle having the outlet in its bottom, combined with the revoluble dial having the series of molds in its periphery, the plungers in said molds, means for actuating the plungers to eject the cheese from the molds, the endless belt having the spaced boards traveling below the dial, and the stationary table in line with the upper portion of said belt; substantially as and for the purposes set forth.

2. In a machine for molding, the vertical receptacle C having the outlet D for the cheese, the axially-revoluble shaft I extending into said receptacle, the sleeve H on said shaft and having the screw J for securing the same thereto, and the blades G carried by said sleeve, said shaft I being extended a sufficient distance above said receptacle to permit of the elevation of said sleeve and blades above said receptacle, combined with the revoluble dial having the series of molds along its periphery to receive the cheese from said outlet D, the plungers within said molds, and means for operating said plungers; substantially as set forth.

3. In a machine for molding, the receptacle having an outlet, combined with the revoluble dial having the series of molds along its periphery, the plungers in said molds, the springs holding the plungers in their normal position, the independent arm in position to engage said plungers one after another as they reach their lower position, and mechanism operated from the driving-shaft for actuating said arm to fully depress the plungers as they line with it; substantially as and for the purposes set forth.

4. In a machine for molding, the receptacle having an outlet, combined with the revoluble dial having the series of molds along its periphery, the plungers in said molds, the springs holding the plungers at their inner position, the independent arm connected with the rock-shaft and located in position to engage said plungers in succession, the contact-arm extending from said rock-shaft, the spring connected therewith, and the thrust-rod driven from the main driving-shaft to depress said contact-arm; substantially as set forth.

5. In a machine for molding, the receptacle having an outlet, combined with the revoluble dial having the series of molds along its periphery, the plungers in said molds, the springs holding the plungers at their inner position, the independent arm connected with the rock-shaft and located in position to engage said plungers in succession, the contact-arm extending from said rock-shaft, the spring connected therewith, the thrust-rod to engage said contact-arm, the eccentric on the auxiliary shaft connected with the main driving-shaft, and the pitman-rod connecting said thrust-rod with said eccentric; substantially as and for the purposes set forth.

6. In a machine for molding, the receptacle containing an outlet, combined with the revoluble dial having the series of molds along its periphery and plungers in said molds, the traveling belt below said dial, the main driving-shaft having the keyed and loose clutch-sleeves, the sprocket-wheel on the said loose clutch-sleeve, connecting-gearing intermediate said sprocket-wheel and the driving-shafts of said dial and belt, and the axially-revoluble rod having a handle at its lower end and connected from its upper end with the said keyed clutch-sleeve; substantially as and for the purposes set forth.

7. In a machine for molding, the receptacle having the outlet, combined with the revoluble dial having the series of molds along its periphery, the plungers in said molds, the traveling belt composed of spaced boards below said dial, connecting mechanism driving both dial and belt and timed to bring one of the boards in line with each mold as the latter in succession reach their lowest position and mechanism for depressing the plungers in succession as the molds and said boards come into line with each other; substantially as and for the purposes set forth.

8. In a machine for molding, the receptacle containing an outlet, combined with the revoluble dial having the series of molds along its periphery, the plungers in said molds, the steam-jacket fitting against the periphery of the dial, and the pipe for dry steam leading into said jacket; substantially as and for the purposes set forth.

Signed at New York, in the county of New York and State of New York, this 27th day of May, A. D. 1899.

JOHN B. PECHT.

Witnesses:
ANDREW STAHL, Jr.,
FRED KODERER.